United States Patent [19]
Kean et al.

[11] Patent Number: 5,910,367
[45] Date of Patent: Jun. 8, 1999

[54] ENHANCED CELLULOSE LOOSE-FILL INSULATION

[75] Inventors: Tod Mitchell Kean; Michael James Kean, both of Chandler; Dennis Dee Smith, Mesa, all of Ariz.

[73] Assignee: Boricel Corporation, Chandler, Ariz.

[21] Appl. No.: 08/895,165

[22] Filed: Jul. 16, 1997

[51] Int. Cl.$^6$ .................... D02G 3/00; E04B 1/74
[52] U.S. Cl. ................ 428/393; 428/359; 252/62
[58] Field of Search ............. 252/8.6, 62; 428/359, 428/393, 74

[56] References Cited

U.S. PATENT DOCUMENTS

| | | | |
|---|---|---|---|
| 2,470,641 | 5/1949 | Portz | 252/62 |
| 4,044,766 | 8/1977 | Kaczmarzyk et al. | 128/285 |
| 4,370,249 | 1/1983 | Bird et al. | 252/62 |
| 4,419,256 | 12/1983 | Loomis | 252/62 |
| 4,468,336 | 8/1984 | Smith | 252/62 |
| 5,352,780 | 10/1994 | Webb | 536/56 |
| 5,365,716 | 11/1994 | Munson | 52/743 |
| 5,453,119 | 9/1995 | Helmstetter | 106/18.12 |
| 5,491,186 | 2/1996 | Kean et al. | 524/13 |
| 5,516,580 | 5/1996 | Frenette et al. | 428/288 |

*Primary Examiner*—Newton Edwards
*Attorney, Agent, or Firm*—Donald W. Huntley

[57] ABSTRACT

A loose-fill cellulose insulation having improved density can be achieved by intermingling the cellulose fibers with natural textile fibers. The textile fibers tend to maintain the spacing between the cellulose fibers, which decreases the density and minimizes settling, of the resulting insulation.

6 Claims, 1 Drawing Sheet

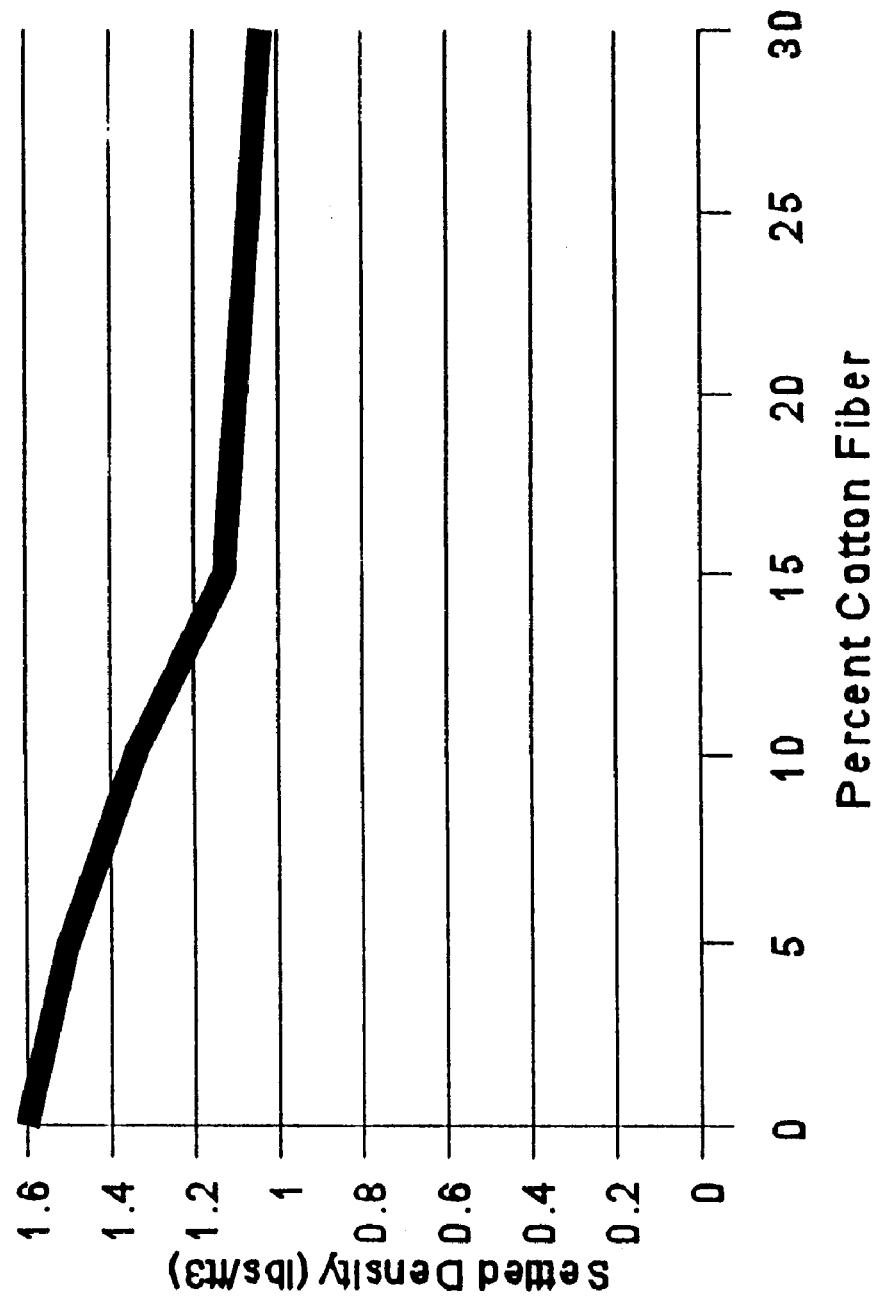

ENHANCED CELLULOSE LOOSE-FILL INSULATION

BACKGROUND OF THE INVENTION

Loose-fill insulation has long been used as thermal insulation above ceilings, in wall cavities and in other areas of residential and commercial buildings. In general, the thermal efficiency of loose-fill insulation is inversely correlated to its density. The ideal loose-fill insulating products of this type consist of a material with small, uniform air pockets resulting in a low settled density insulation that resists the transfer of temperature and sound by direct conduction or convection of the air in the medium. A lower density insulation generally results in a product that provides the benefits of less material, less insulation weight requiring less building structural strength, and less installation time.

Loose-fill insulating material is normally installed in an attic or wall, using equipment for separating the fiber clumps and transporting the material in an airstream. The insulating product is blown between the attic joists in walls and in other locations. This process tends to aerate and fluff the insulation material, prior to it being placed into the space being insulated. After installation there is some settling of the insulation material, largely due to its own weight and internal structure, and also as a result of vibration and other outside forces.

Many attempts have previously been made to improve the efficiency and performance of insulation. For example, Smith, in U.S. Pat. No. 4,468,336, discusses the advantages of mixing a synthetic staple fiber with the loose-fill cellulose to lower the settled density of the resulting insulation. Smith proposed adding 2% to 25% polymeric staple fibers, having a denier between 1.8 and 60 and a fiber length between 4 and 20 mm, to cellulose. Smith teaches that the settled density of the resulting insulation product improved from 2.5 pounds per cubic foot for cellulose only, to 1.1 to 2.1 pounds per cubic foot for the mix insulation. Smith claims that the resulting product has less weight to fill a space, is less expensive to manufacture per unit of volume, and requires less structural support.

Helmstetter, U.S. Pat. No. 5,453,119 discloses the use of cotton and other fibers, including waste fibers obtained from discarded clothing, carpet, and the like. Helmstetter addresses the problem of increasing the insulating material's resistance to decay, and reducing the amount of free fibrous particles that may escape from the insulating material during handling. It does not deal with the problem of increasing loft when used in combination with other cellulosic materials such as reclaimed newspaper. Other patents relate to the application of a fire retardant to the cellulosic insulation material.

Despite the extensive effort in this area previously expended, a continuing need exists for an insulating material that provides a combination of minimal weight, ease of manufacture using conventional equipment, reduced dust, and compliance with applicable building codes and other regulatory standards.

SUMMARY OF THE INVENTION

The present invention provides a thermal and acoustical loose-fill insulation material for use in attics, walls and other cavities within buildings. The present invention provides an insulating product with substantially improved settled density, that is more efficient by weight than current products.

Specifically, the present invention provides an insulating material comprising cellulose fiber and about from 0.5 to 40.0% by weight natural textile fiber in the form of individual fibers or small clumps of fibers.

BRIEF DESCRIPTION OF THE DRAWING

The Figure is a graphical illustration of the relationship between the woodpulp-based fiber and the natural textile fiber, and the resulting insulation density.

DETAILED DESCRIPTION OF THE INVENTION

The present invention is based on the discovery that the performance characteristics of cellulose loose-fill insulation can be markedly improved by an admixture of milled woodpulp-based material with natural textile fibers. In particular, a substantial improvement in the settled density of the resulting loose-fill insulation is realized.

The insulation of the present invention contains a major portion of cellulose. While a wide variety of cellulose sources can be used, reclaimed woodpulp-based waste material can be effectively reused in the present thermal or acoustical insulating material. This is a cost effective source of a component of the insulating material and an environmentally beneficial reduction of waste streams. Many grades of paper and/or pulp based products can be used as the source for cellulose fiber in the present invention. Representative of these cellulose sources are newspaper, computer printer paper, writing paper, and chip-board. Of these cellulose sources, reclaimed newsprint and other woodpulp-based materials that have been retrieved from waste streams are particularly cost effective, and are accordingly preferred. The cellulose is milled to reduce its size to individual fibers or fibrous clumps of cellulose, preferably having an average size of less than about 10 mm.

The milling of reclaimed woodpulp-based waste material can be carried out by a variety of well-known processes familiar to those that are skilled in the art of cellulose regeneration. It can be performed using one, or a combination of several, different pieces of equipment, including but not limited to hammer mills, single or double disk refiners, Jordans, Advanced Fiber Technology (AFT) equipment and other equipment to fiberize the woodpulp-based waste material. For efficient thermal performance, the cellulose-based material is reduced to individual fibers or small fiber clumps, preferably having an average size of less than about 10 mm.

The thermal materials of the present invention further comprise about from 0.5 to 40.0% by weight of natural textile fiber. The incorporation of natural textile fiber in the loose-fill insulation markedly improves the desired low density characteristics of the insulating material. In addition, incorporation of the natural fiber significantly diminishes the settling of the insulation that would otherwise occur after installation. In general, the benefits of the natural fiber are not realized at concentrations below about 0.5% by weight, and little additional benefit in performance characteristics are obtained at concentration of the natural fiber greater than about 40% by weight of the final product.

Either or both of virgin fiber and reclaimed textile fiber can be used. A wide variety of natural fibers can be used, including abaca, alpaca, chicken feather fibers, cotton, flax, hemp, kapot wool and woodpulp. Of these, cotton has been found to be particularly satisfactory because of ready availability and insulating performance, and is accordingly preferred. If reclaimed textile waste is used, it may require processing prior to its use. This can be accomplished using one or a combination of conventional treatment apparatus, including, for example, shredders, openers, garnetts, rag tearers, rotary blade cutters, and knives. The natural fiber should be reduced to a fiber or fibrous clump, while maintaining significant fiber length.

The fibers are preferably treated with at least one fire retardant material. A wide variety of known fire retardant materials can be used, including, for example, aluminum sulfate, ammonium sulfate, boric acid, calcium sulfate and sodium carbonate. Of these, those based on boric acid have been found to be particularly satisfactory, including boric acid itself and five mole borax. The concentration of the fire retardant material will necessarily vary with the cellulosic and natural fiber components selected, their relative concentrations, and the specific fire retardant material. The fire retardant material can be applied to the combined fibers with conventional wet or dry application techniques. The fire retardant can be incorporated into the present thermal materials by application to the cellulosic component prior to combination with the natural fiber or after blending with the second component. If applied to the cellulose alone, the fire retardant treated cellulose typically has a settled density of about from 1.4 to 2.0 lb/ft$^3$ before combination with the natural fibers. In general, about from 5 to 25% by weight of the fire retardant material, based on the total weight of the insulating material, is used. The settled density of the cellulose can be about from 0.8 to 2.0 lb/ft$^3$ and the resulting loose fill insulating material can generally have a settled density of about from 1 to 1.6 lb/ft$^3$.

The cellulose and natural fiber components can be combined by conventional blending equipment, including that noted above for fiberizing the cellulose component of the present blends. In fact, additional mixing or milling is often preferred to insure a uniform distribution and opening of the textile fibers. A particularly satisfactory method of blending involves adding a second component to an air stream in which a first component is suspended.

The resulting insulating material is generally compressed in a packaged form for storage and shipping until its use. At the installation site, the insulation can be manually put in place or, more commonly, it can be pneumatically conveyed to the attic, wall or other cavity.

Insulation normally settles, beginning at installation and continuing over the product life. This settling decreases the effectiveness of the insulation with the collapse of small air pockets in the insulation. The higher density of the settled product may diminish the R-value. Federal Government regulations require that loose-fill insulation be installed at the tested settled density.

The instant invention provides a low settled density insulation product that is relatively inexpensive to manufacture using conventional equipment. The present product, prepared, as it is, from materials that may be part of the waste stream, converts these materials into a durable product, thus reducing the demand for landfill or other disposal methods. In addition, the present low settled density insulation product significantly reduces the dust and particle fly that is associated with conventional loose-fill cellulose insulation, while meeting applicable regulatory standards for buildings and other structures.

While the desirable performance characteristics of the present invention are not fully understood, it is believed that the natural fibers used in the present invention provide an irregular shape and natural three-dimensional crimp, and that the relatively long length of natural fibers and the natural fibrils or scales that are often part of these fibers all contribute to their superior and unexpected performance characteristics. Specifically, these characteristics are believed to help maintain an open matrix in the resulting insulation, by providing structural strength to resist the collapse of the small air pockets that form between cellulose fibers; and between the textile and cellulose fibers. This contributes to a desirable low settled density insulation product and a reduction in the weight per unit volume to be supported by the structure. The effect of natural fiber on settled density is summarized in the following Table.

TABLE 1

| Example | Woodpulp based fiber (%) | Pounds of Cotton (%) | Settled Density (lb./ft$^3$) |
|---|---|---|---|
| A | 100 | 0 | 1.60 |
| 1 | 95 | 5 | 1.5 |
| 2 | 90 | 10 | 1.34 |
| 3 | 85 | 15 | 1.13 |
| 4 | 80 | 20 | 1.10 |
| 5 | 75 | 25 | 1.07 |
| 6 | 70 | 30 | 1.04 |

The present invention is further illustrated in the following specific examples, in which parts and percentages are by weight.

EXAMPLES 1–6 and COMPARATIVE EXAMPLE A

Cotton textile fibers and recycled newsprint were shredded and blended using a Bauer 36 inch double disc refiner. Cotton textile fibers were opened by shredding until reduced to individual fibers or fiber clumps, generally of a length of less than 5 cm. The opened fibers were metered into an airstream containing milled woodpulp-based fibers, at the rates shown in the Table. The particle size of the woodpulp-based fiber was less than 10 mm. Recycled newsprint fiber and reclaimed cotton textile fibers were mixed together using the same double disc refiner in a container to achieve a substantially uniform distribution. This mixture was treated with 15% by weight of boric acid for fire retardancy. The combined products were then blown through a standard insulation blowing machine. The resulting settled density was measured using ASTM standards C739-91. This process was repeated with different percentages of cotton, to determine the resulting settled density. The resulting insulation material generated the test results as set forth in Table 1 and FIG. 1.

We claim:

1. A loose fill insulating material consisting essentially of cellulose fiber and about from 0.5% to 40.0% by weight of natural textile fiber in the form of individual fibers or small clumps of fibers, and optionally at least one fire retardant material.

2. An insulating material of claim 1 wherein the cellulose consists essentially of reclaimed or recycled paper or cardboard.

3. An insulating material of claim 1 wherein the at least one fire retardant material is present in an amount of about from 5.0% to 25.0% by weight of the resulting insulating material.

4. An insulating material of claim 1 wherein the natural textile fiber consists essentially of cotton.

5. An insulating material of claim 3 wherein the cellulose fiber is treated with a fire retardant and the resulting fire retardant treated cellulose has a settled density of about from 0.8 to 1.6 lbs/ft$^3$.

6. An insulating material of claim 1 having about from 3 to 35.0% by weight natural textile fibers.

* * * * *